May 12, 1959 D. C. BEAULIEU ET AL 2,886,190
SHEET HANDLING MECHANISM
Filed Dec. 29, 1953 14 Sheets-Sheet 1
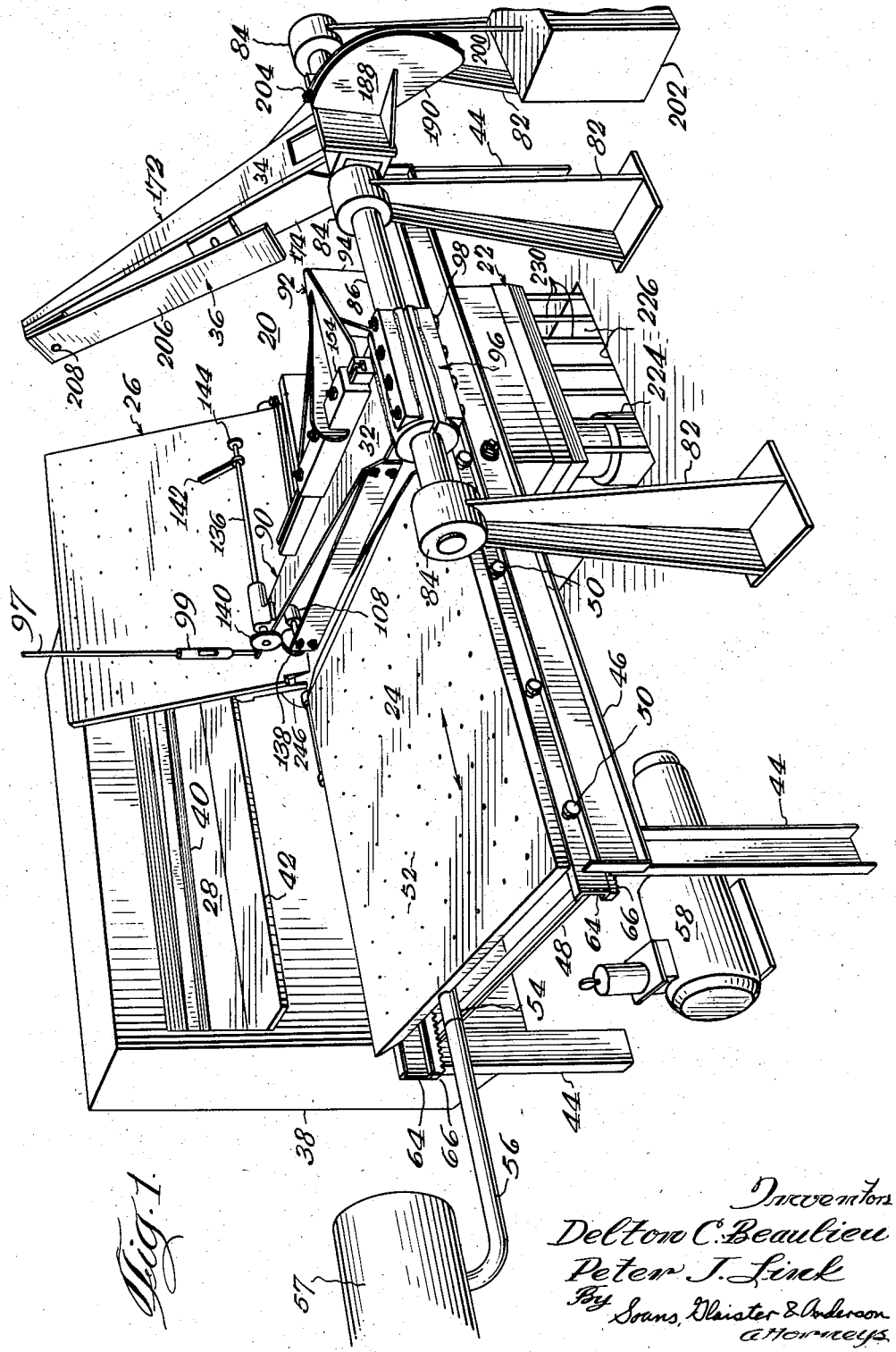

May 12, 1959     D. C. BEAULIEU ET AL     2,886,190
SHEET HANDLING MECHANISM
Filed Dec. 29, 1953     14 Sheets-Sheet 2
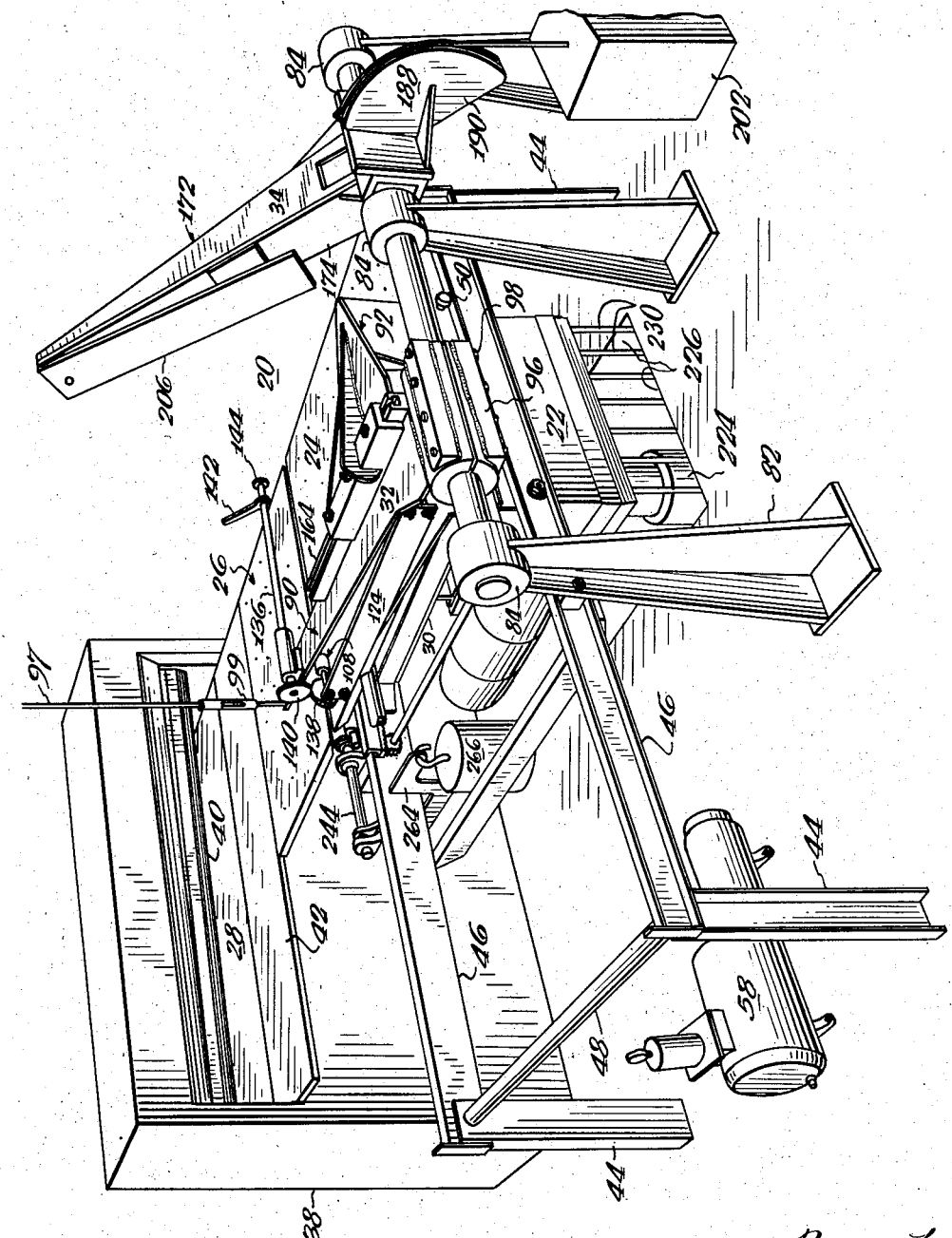

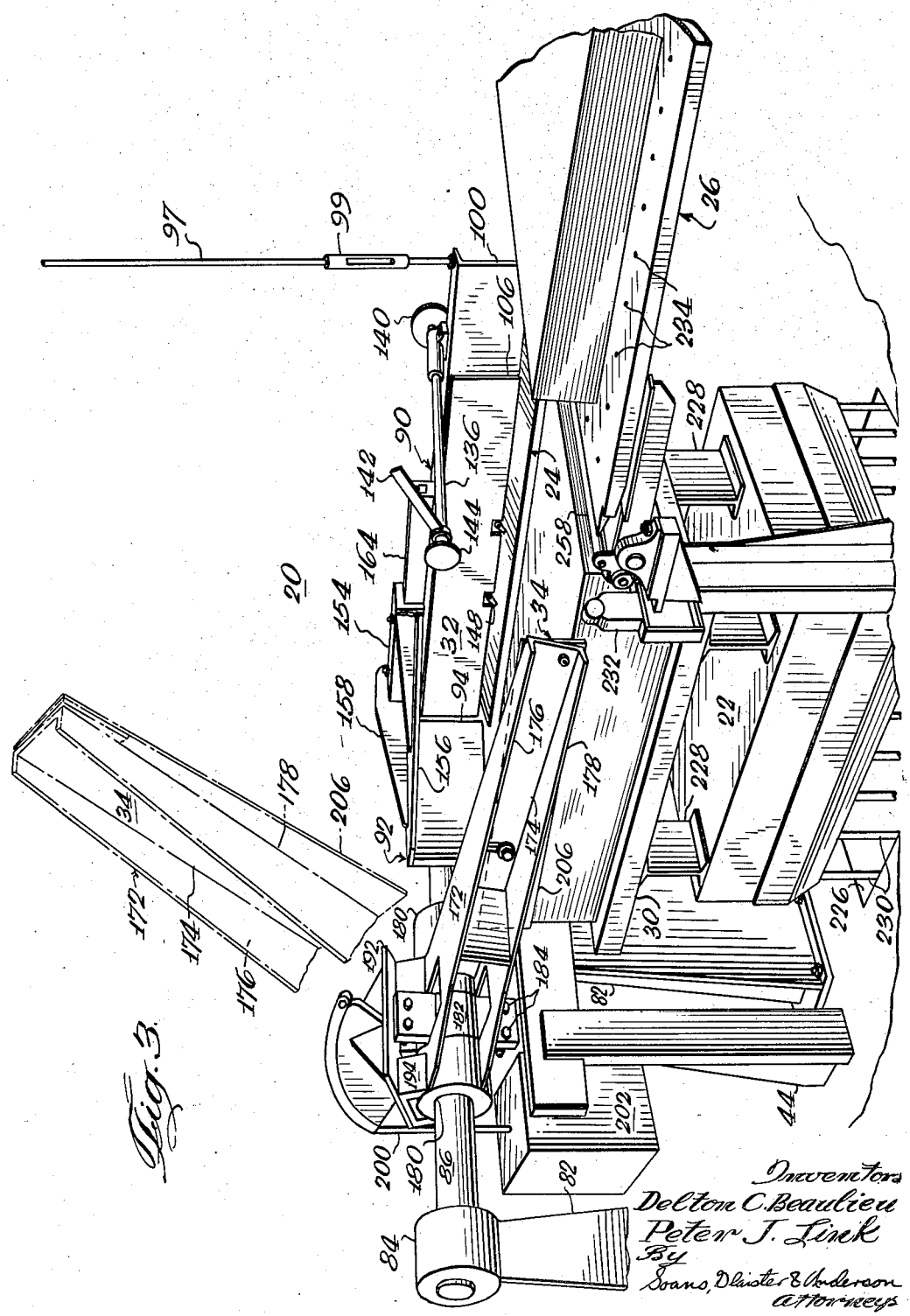

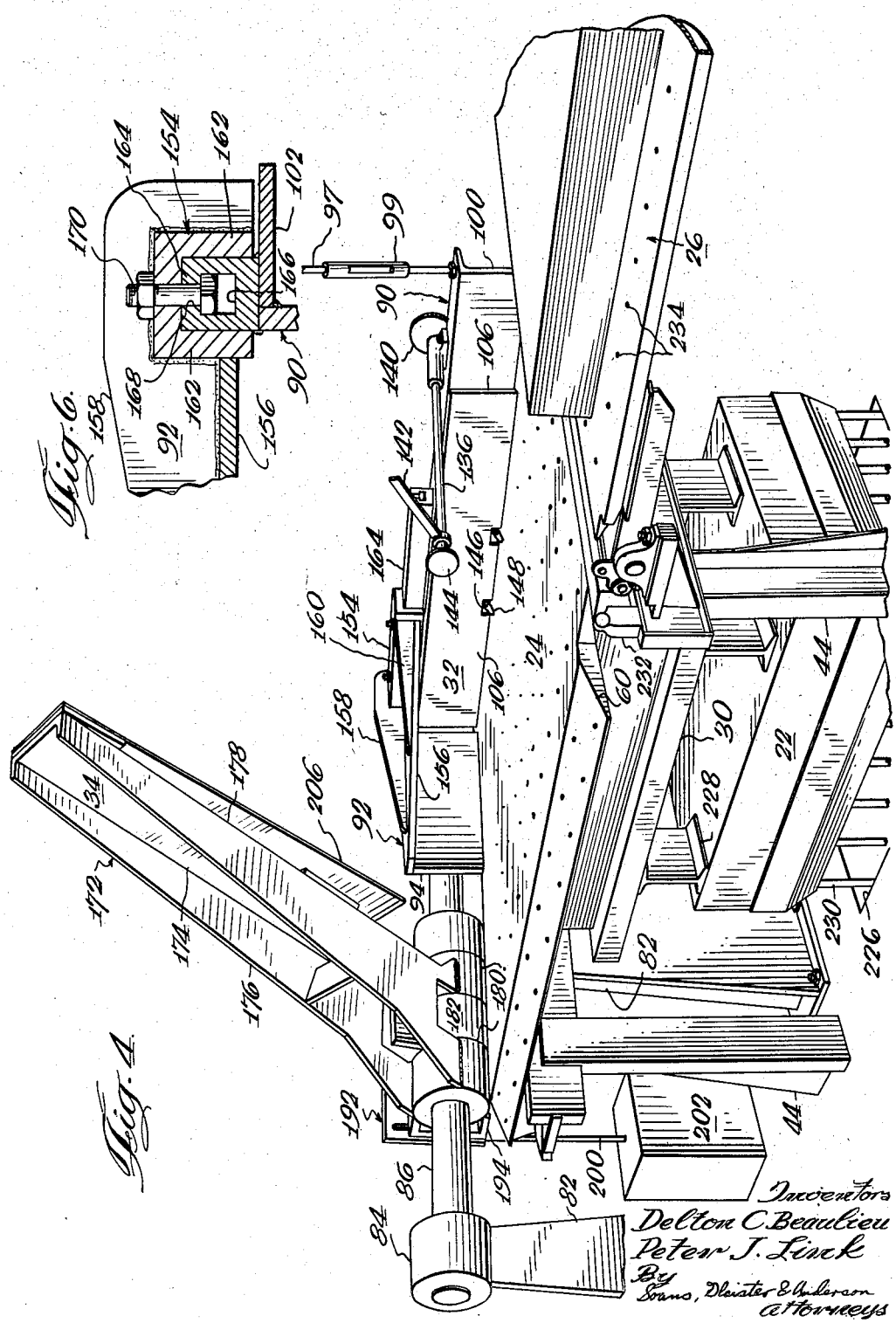

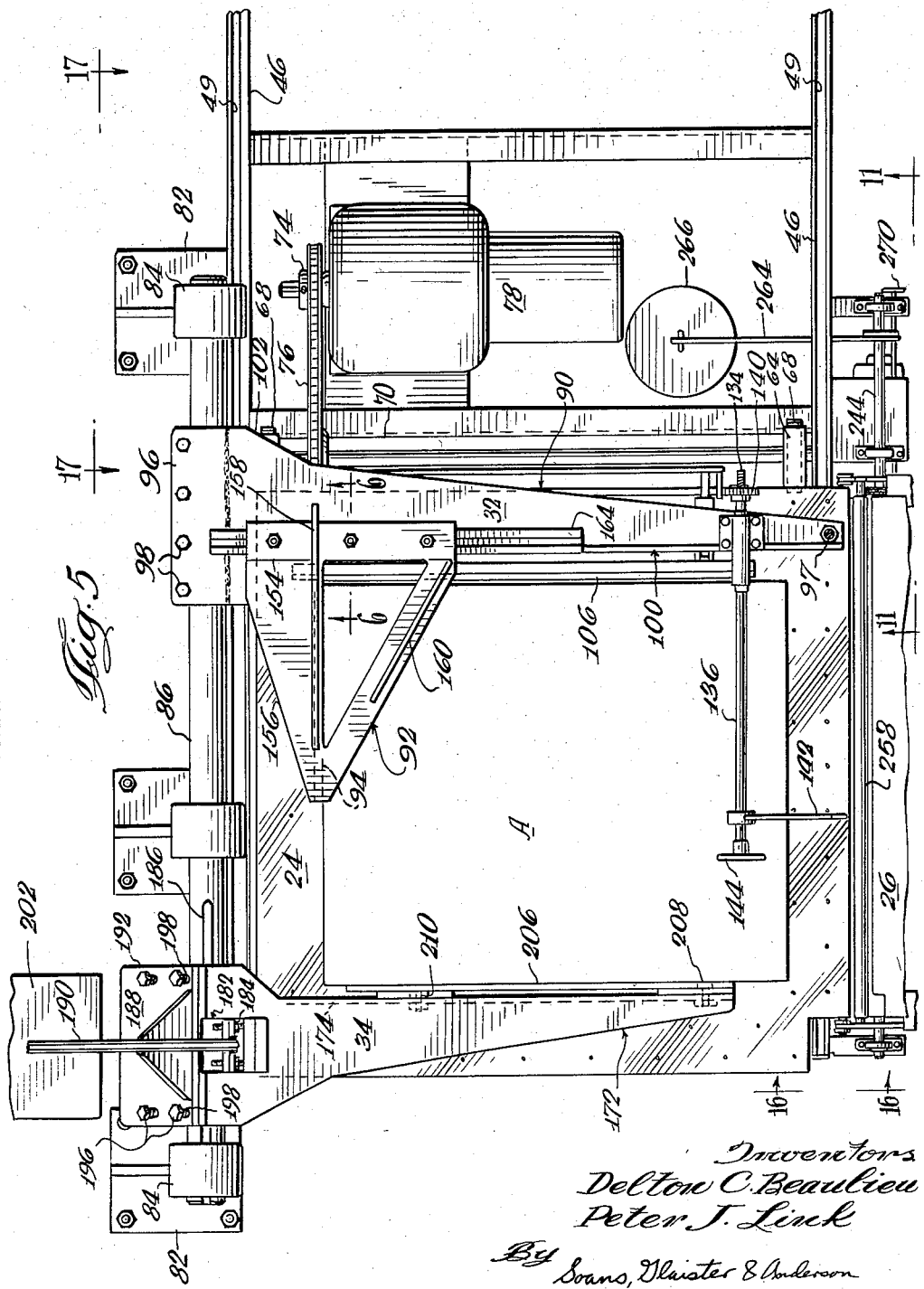

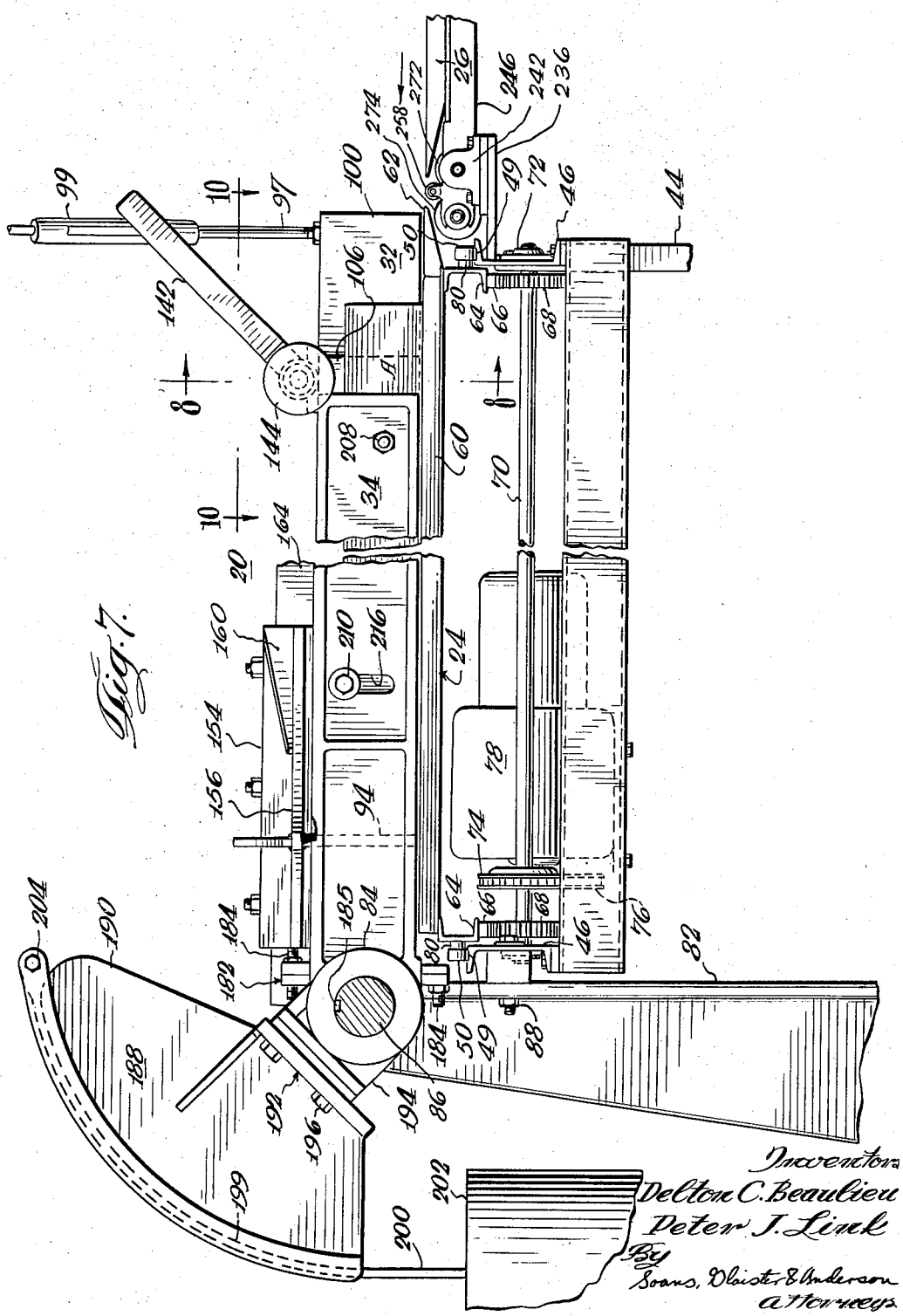

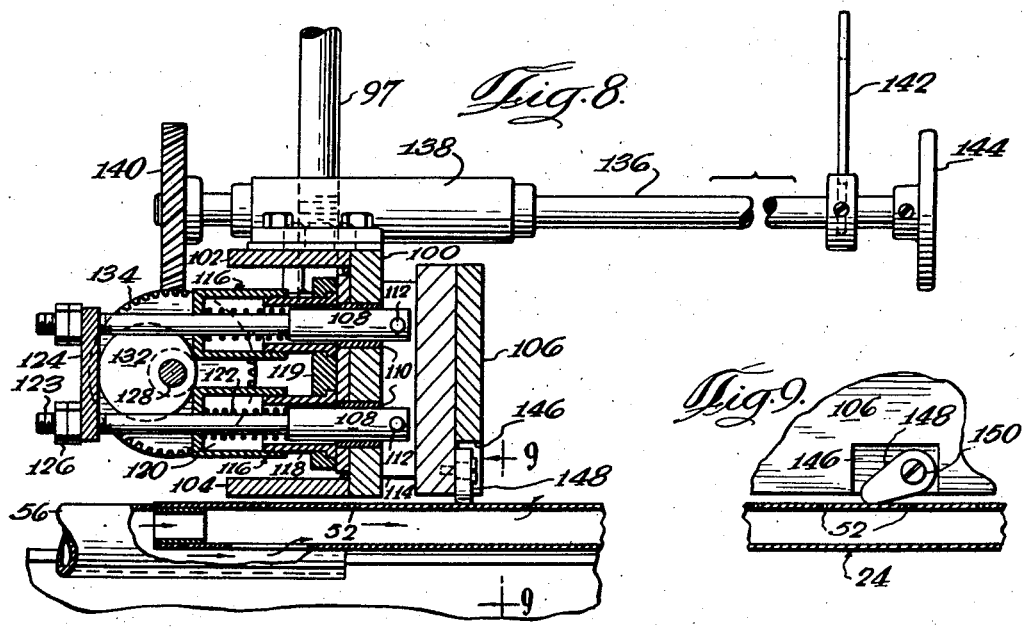
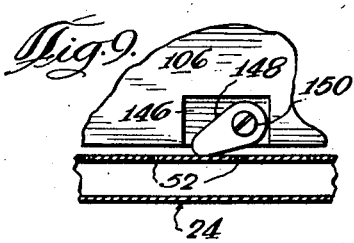
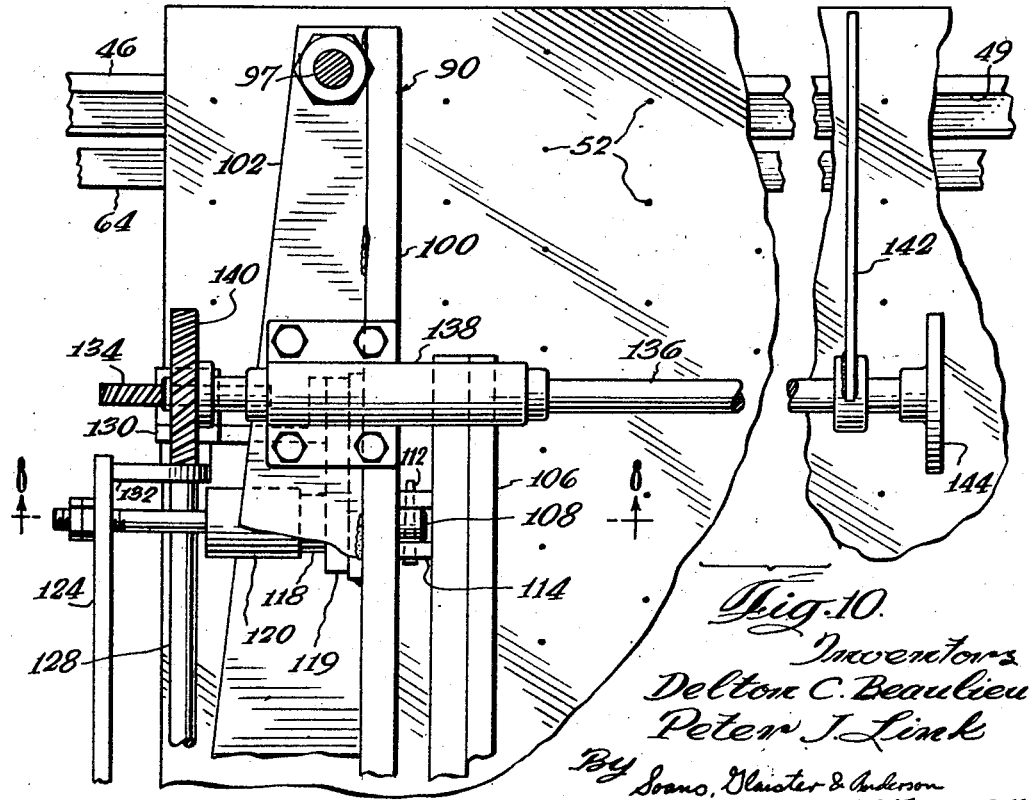

May 12, 1959  D. C. BEAULIEU ET AL  2,886,190
SHEET HANDLING MECHANISM
Filed Dec. 29, 1953  14 Sheets-Sheet 8

Inventors
Delton C. Beaulieu
Peter J. Link
By Soans, Pfeister & Anderson
Attorneys

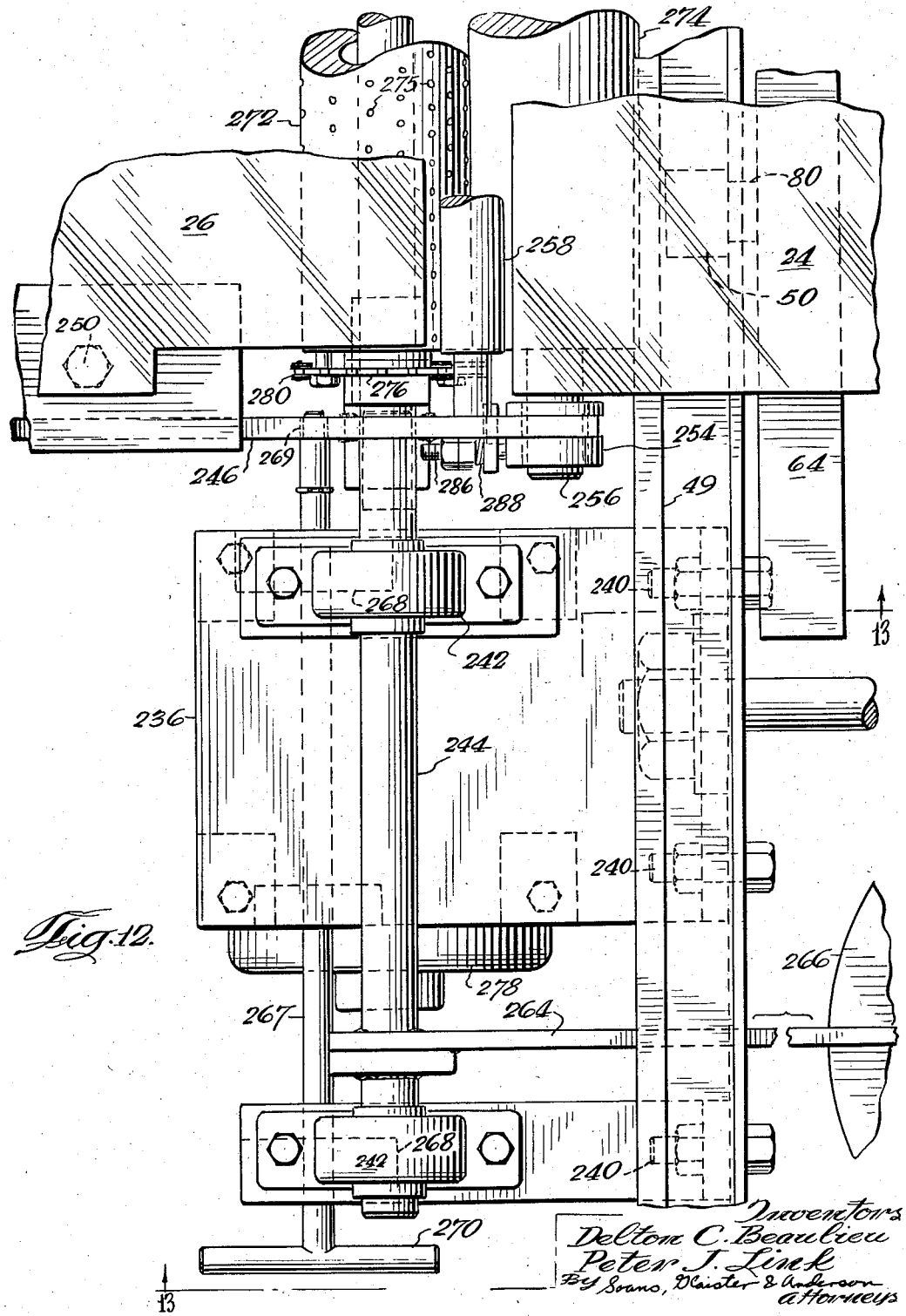

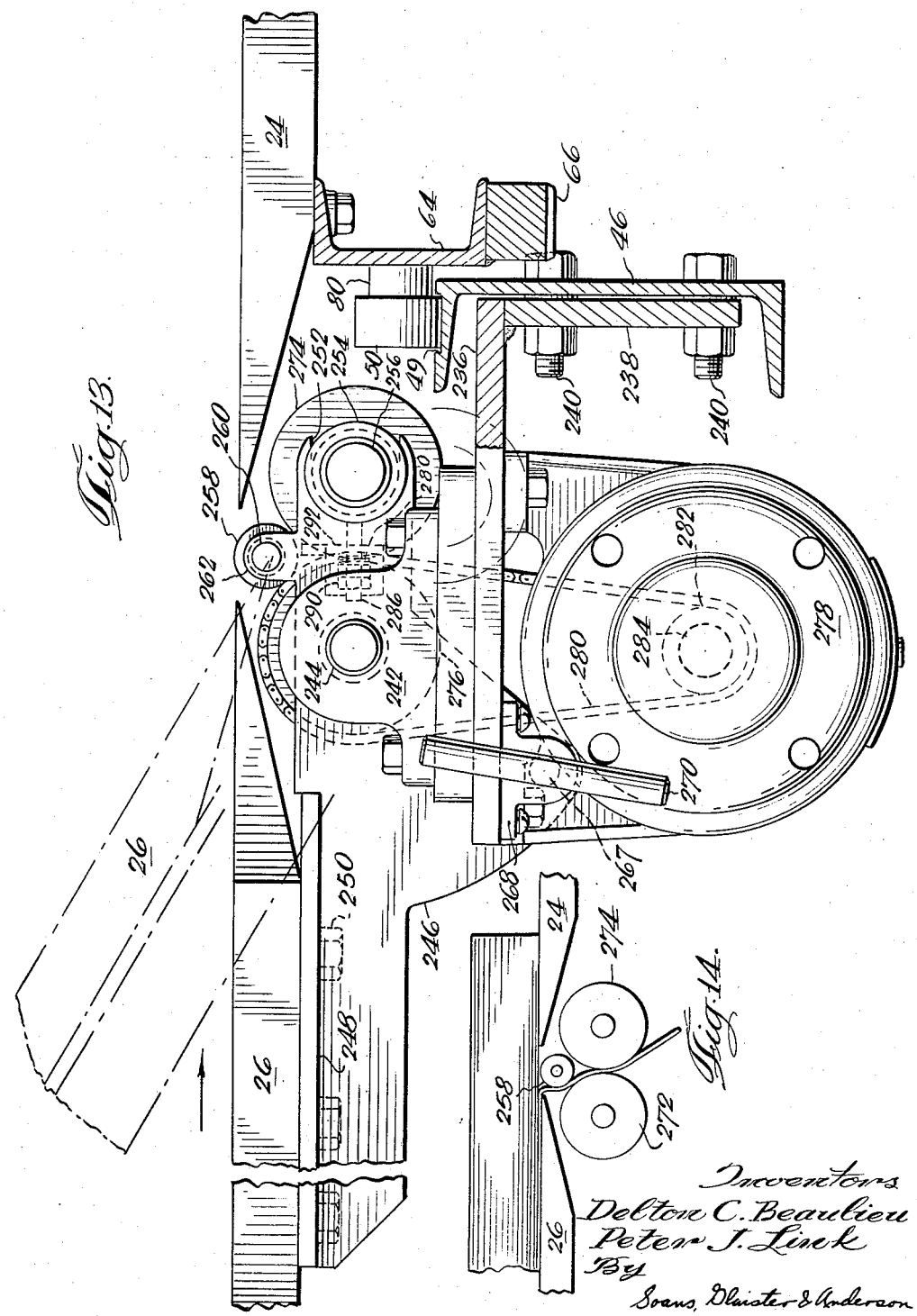

May 12, 1959 D. C. BEAULIEU ET AL 2,886,190
SHEET HANDLING MECHANISM
Filed Dec. 29, 1953 14 Sheets-Sheet 11
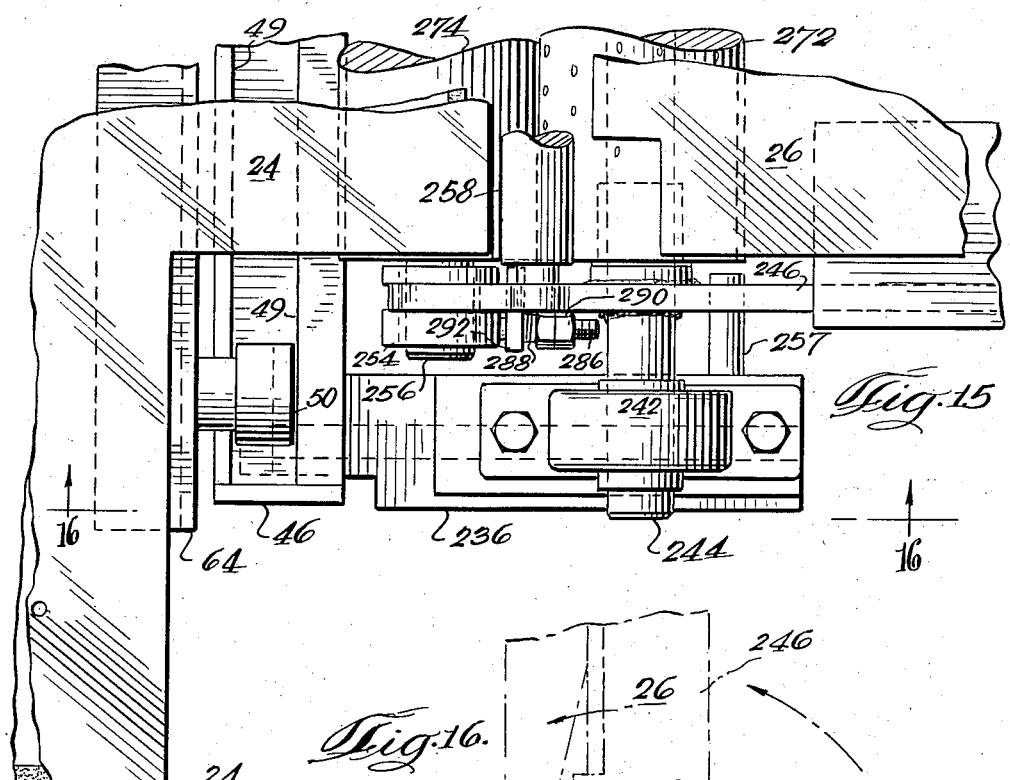
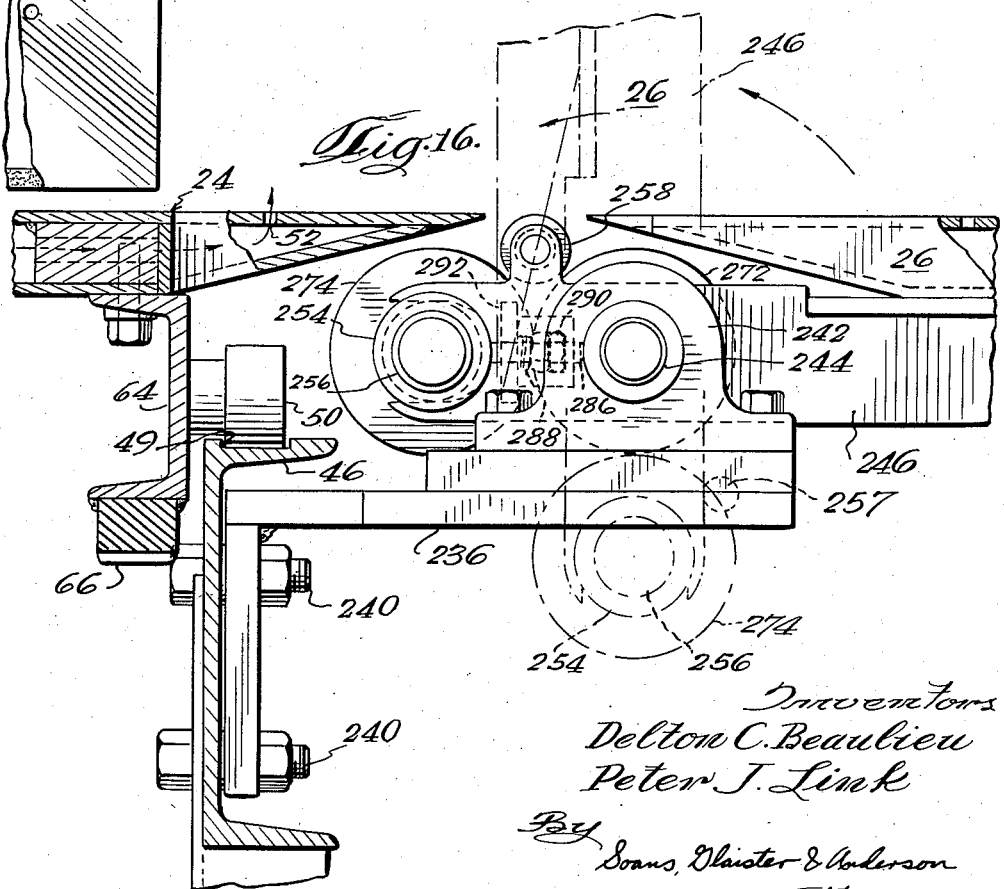
Inventors
Delton C. Beaulieu
Peter J. Link
By
Soans, Glaister & Anderson
Attorneys

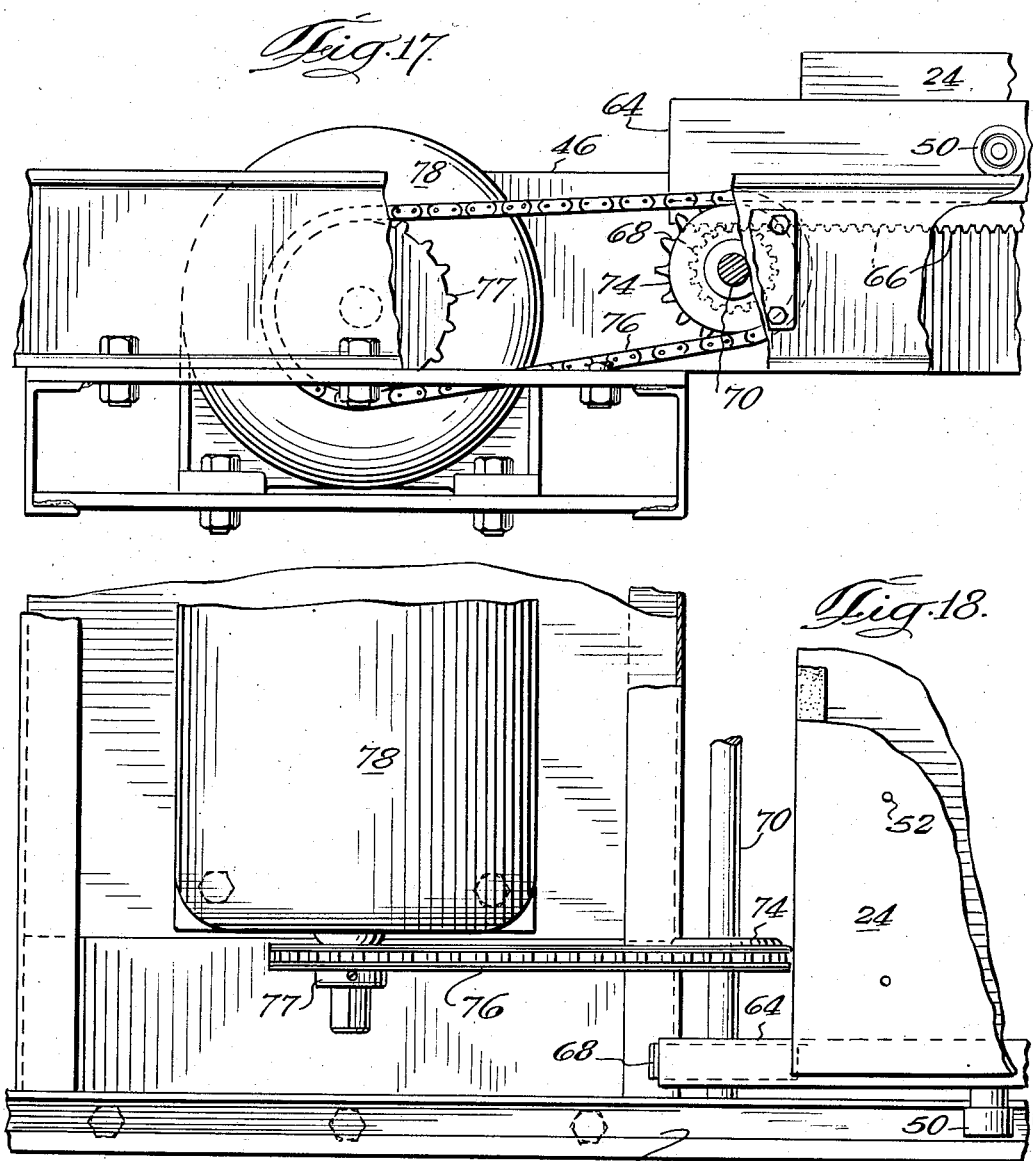

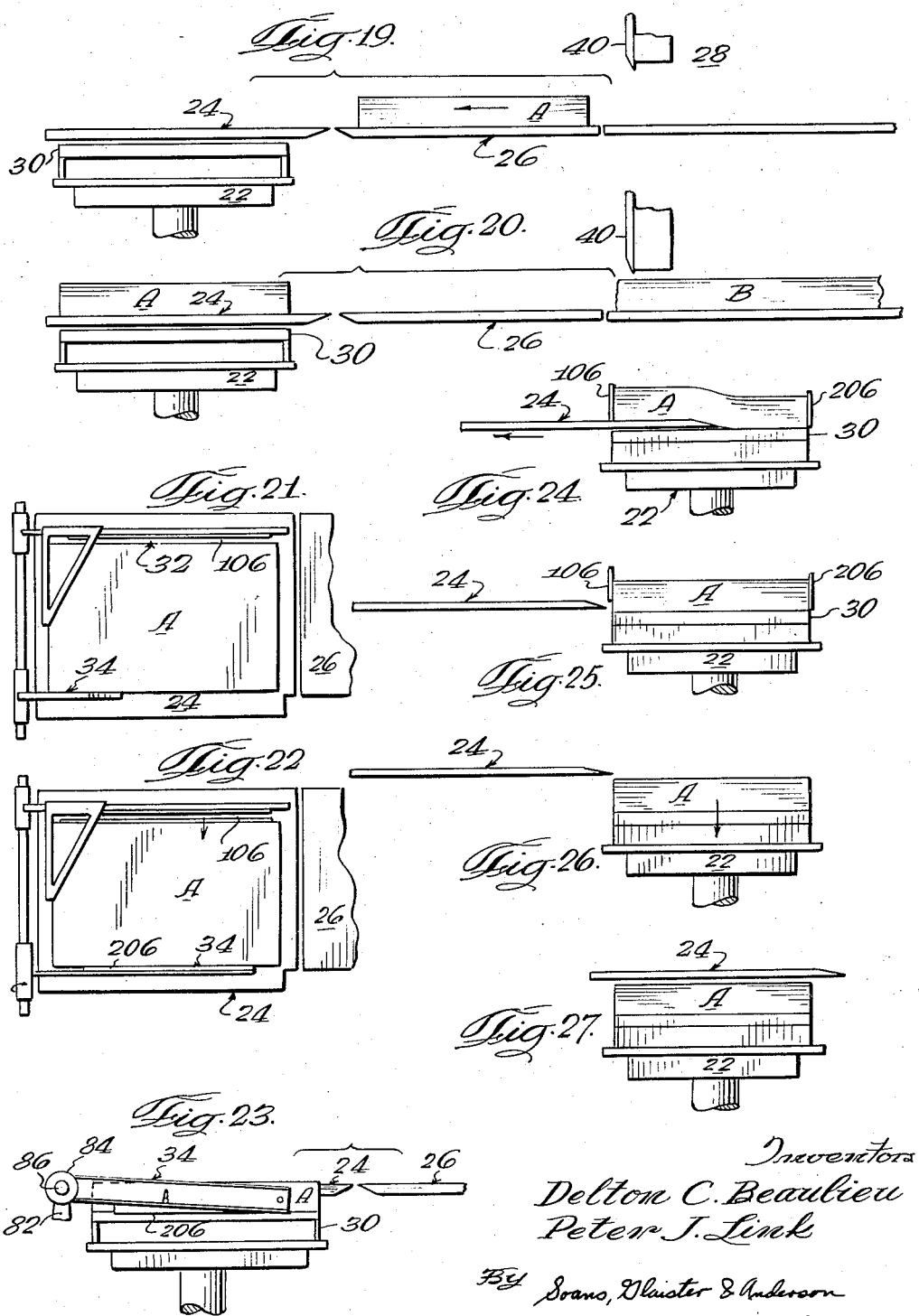

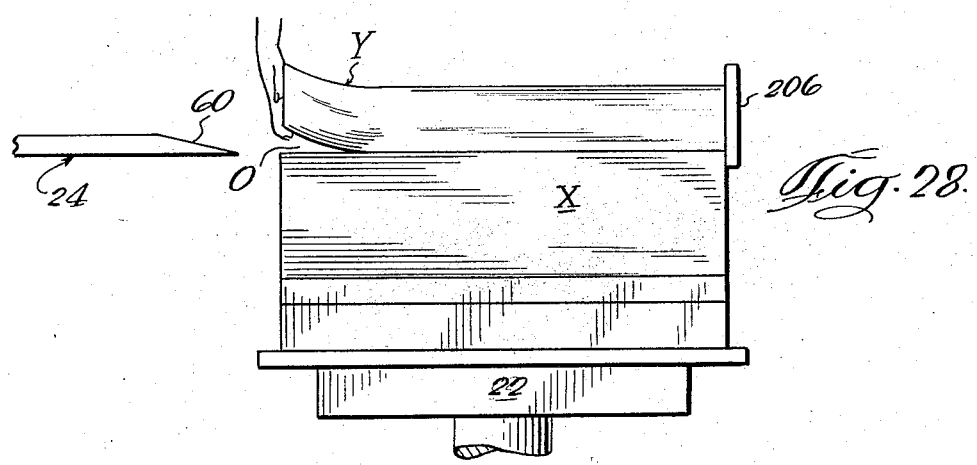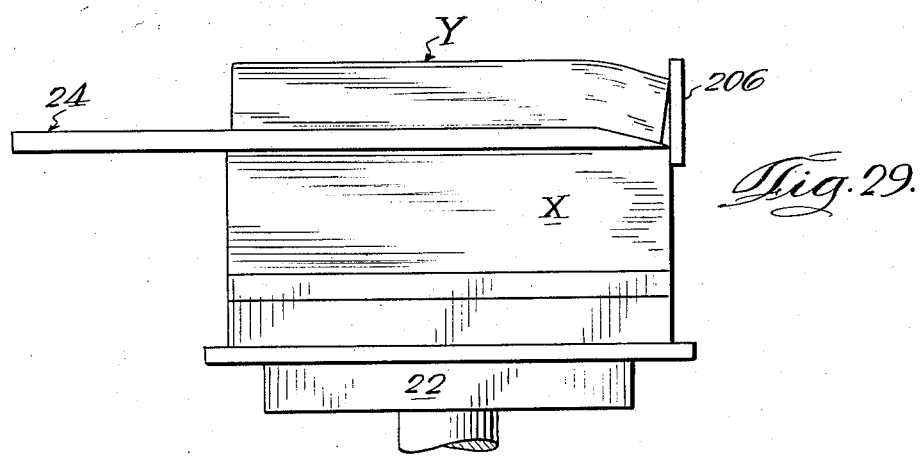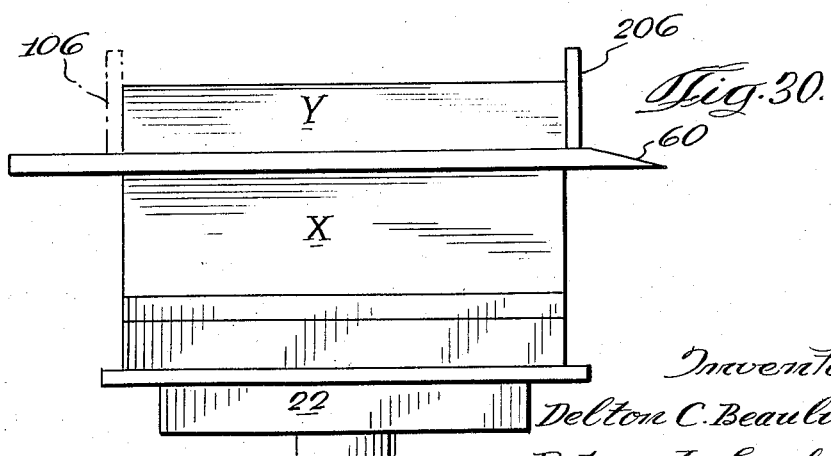

United States Patent Office 2,886,190
Patented May 12, 1959

2,886,190

SHEET HANDLING MECHANISM

Delton C. Beaulieu and Peter J. Link, Neenah, Wis., assignors, by mesne assignments, to Kimberly-Clark Corporation, a corporation of Delaware Application December 29, 1953, Serial No. 400,939

14 Claims. (Cl. 214—6)

The present invention relates generally to the handling of sheet material, and is more particularly directed to the handling of piles of paper sheets.

The handling of quantities of flexible sheet material, such as paper, presents certain problems which have not been satisfactorily solved heretofore. One of the more troublesome problems is the arrangement of smaller piles, usually not over six inches in height, into a vertically aligned stack or lift, which may be up to five feet or more in height, for shipment to the consumer. It is desirable, of course, to produce as neatly an aligned stack as possible in order to facilitate packaging and to avoid the possibility of damage to the edges of the sheets. The latter is particularly important with respect to quality grade sheet materials, wherein a damaged edge portion frequently necessitates rejection of the sheet. Moreover, where the sheets are to be used in a printing press a damaged edge may break the printing plates and thereby cause a costly shut down of the press.

The primary object of the present invention is to provide novel and improved apparatus for handling piles of flexible sheet material in a manner assuring vertical alignment of the sheets and resulting in a minimum of damage to the sheets.

Other objects and advantages will become readily apparent as the disclosure progresses with respect to the accompanying drawings, wherein:

Figure 1 is a perspective view of apparatus embodying the invention;

Figure 2 is a perspective view, similar to Figure 1, wherein the loading table has been moved to its operative position and the tiltable table between the trimmer and the stacking mechanism has been lowered to its horizontal position;

Figure 3 is an enlarged perspective view of the stacking mechanism, looking inwardly toward the end at which the piles of trimmed paper are being stacked;

Figure 4 is a perspective view, similar to Figure 3, with the loading table moved into position for receiving a pile of trimmed sheets;

Figure 5 is a fragmentary plan view of the paper stacking machine, with the movable parts disposed generally as in Figure 3;

Figure 6 is an enlarged, sectional detail taken along the line 6—6 in Figure 5;

Figure 7 is an enlarged end view, taken from the left in Figure 5, with parts broken away;

Figure 8 is an enlarged, sectional detail taken along the line 8—8 in Figure 7, with parts broken away and in section;

Figure 9 is an enlarged, fragmentary view taken on line 9—9 in Figure 8;

Figure 10 is an enlarged, fragmentary plan view, taken along the line 10—10 in Figure 7, with parts broken away;

Figure 12 is an enlarged, fragmentary plan view of the structure in Figure 5, particularly illustrating the operating mechanism for the rollers disposed between the tiltable table and the loading table;

Figure 13 is a view taken along the line 13—13 in Figure 12, the broken lines indicating the elevated position of the tiltable table;

Figure 14 is a diagrammatic illustration of the function of the rollers disposed between the tiltable table and the loading table;

Figure 15 is a plan view of Figure 16;

Figure 16 is a side elevational view, partly in section, taken on line 16—16 in Figure 15, and indicated also in Figure 5;

Figure 17 is an enlarged, fragmentary view along line 17—17 of Figure 5, with parts broken away in the interest of clarity;

Figure 18 is a plan view of the portion of the stacking mechanism shown in Figure 17;

Figure 11:
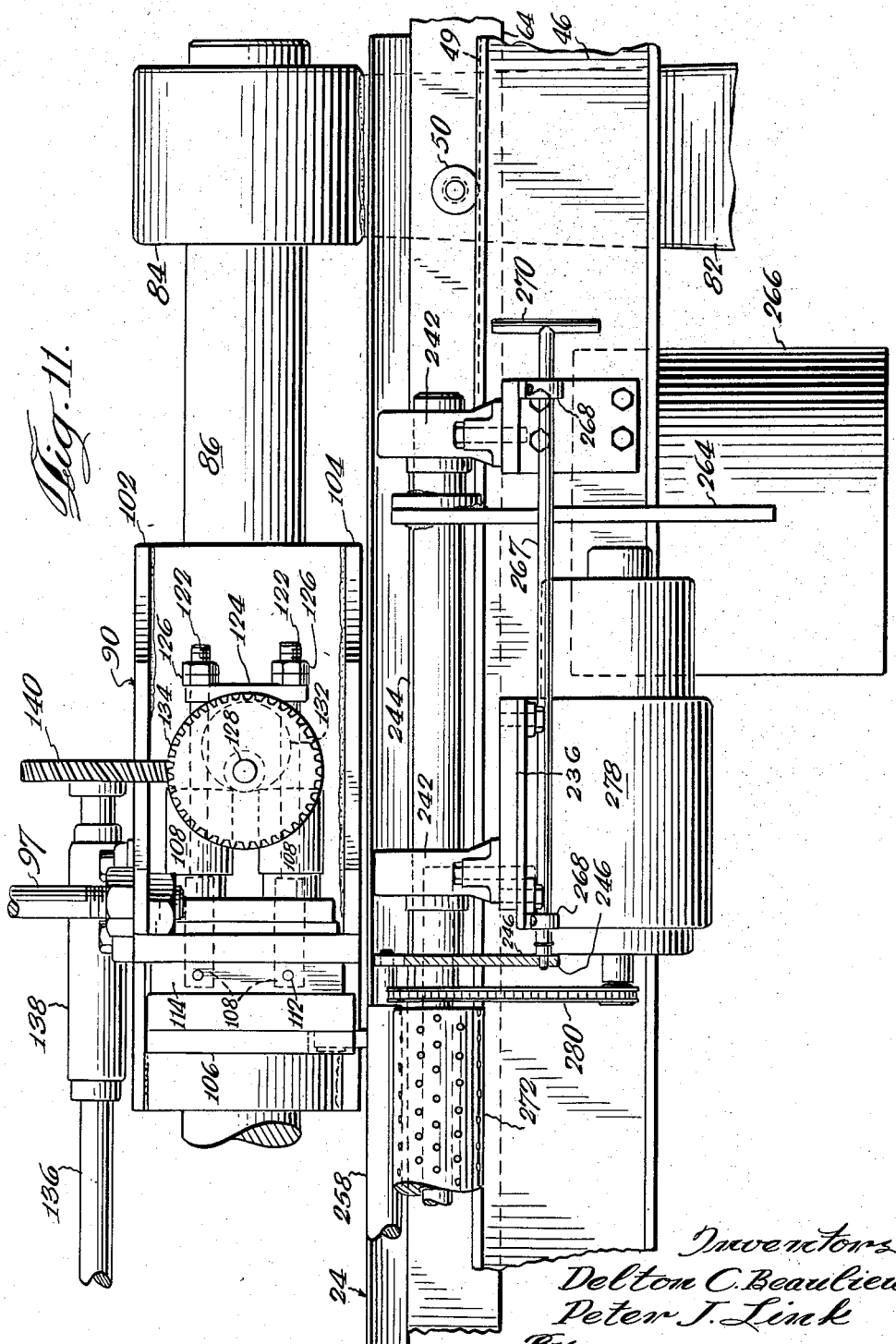
Figure 11 is an enlarged, fragmentary side view of the structure taken along the line 11—11 in Figure 5.

Figures 19 to 30, inclusive, are diagrammatic illustrations of the operation of the mechanism in handling piles of paper sheets.

The apparatus chosen to illustrate the present invention is particularly adaptable to the handling of sheet stock. In the usual preparation of paper sheets for shipment, a pile of sheets of about five or six inches high is cut to a uniform size in a trimming machine, and then stacked along with other piles on a skid or the like to provide the desired number of sheets. Ordinarily, two men handle the stacking of the trimmed sheets on the skid, and the weight and bulk of the paper is such that these men can lift only a portion of a trimmed pile at a time. Moreover, a single stack or lift is generally four to six feet in height and, consequently, requires a great deal of handling of the sheets during the stacking operation.

The manual handling of relatively small portions of each stack not only causes an appreciable amount of damage to the sheets but, also, results in an irregular stack of sheets. The latter is due somewhat to the tiring of the handlers from constant lifting of heavy piles of paper and, also, due to the fact that the individual piles are too heavy and bulky to shift once they have been placed on the stack. Furthermore, in the handling of coated paper, super-calendered paper, glassines, bonds and the like, there is an inherent tendency of the sheets to spill when arranged in a stack, which makes such sheets very difficult to handle manually. The present invention provides, among other things, a solution to the problem of fatigue of the stacking personnel and to the problem of maintaining proper alignment of the sheets.

Referring particularly to Figures 1–4, it is seen that the apparatus chosen to illustrate the present invention comprises generally a paper stacking machine, designated by the reference numeral 20, including a vertically movable platform 22, a laterally retractable table 24, and a tiltable table 26 for providing a continuous horizontal surface between the table of a trimmer 28 and the retractable loading table 24.

Briefly, the objects of this invention are achieved by moving the piles of trimmed paper sheets, as from the trimmer 28 across the table 26, onto the retractable loading table 24, positioned as in Figure 2, for deposit thereby onto a skid 30 carried by the vertically movable platform 22. As each pile is moved onto the loading table 24, it is placed with two of its adjoining side edge surfaces abutting an L-shaped structure forming a sheet aligning mechanism 32. An arm 34 having a vertical face plate 36 on its inner side is then moved into contact with one of the edges of the pile which is opposite to an edge engaged by the pile aligning mechanism, in order to correct any misalignment of the sheets which may have occurred during the movement of the pile from the trimmer.

The loading table 24 bearing the aligned pile of sheets is then retracted to the position of Figure 1, and the sheets are thereby deposited onto the platform 22 which has been moved to a position immediately underlying the loading position of table 24. Succeeding piles of paper sheets are handled in a similar manner, with the pile aligning mechanism 32 maintained in the same position so that when the table 24 is withdrawn from its sheet-supporting position, that is, from the position shown in Figure 2 to that of Figure 1, the sheets will be deposited in true vertical alignment with the previously placed piles on the platform 22.

With reference also to Figures 5–27, a detailed explanation of the illustrated apparatus will be given, in order to provide a better understanding of the invention and an appreciation of the many advantages it offers.

The trimmer 28, illustrated in Figures 1 and 2, is of a conventional design, including a frame 38, a knife 40, and a table 42, and is shown primarily to depict the relationship of the stacking mechanism to the mechanism usually employed in trimming the sheets to a uniform size prior to stacking for shipment. Furthermore, it affords a better understanding of the utility of the tiltable table 26 and its association with the trimmer table 42 to provide a continuous horizontal surface for movement of the piles of paper sheets from the trimmer to the stacking mechanism. It should be understood, however, that the stacking machine 20 is adaptable for use apart from any other mechanism and that the source of the sheets which are deposited on the table 24 is immaterial to the broader concept of the invention.

The stacking machine 20 comprises a rectangular frame structure including an upright channel member 44 at each corner supporting a pair of elongated channel side members 46 in spaced, parallel relation. Additional bracing is provided for the frame by a series of transverse members, including the end cross member 48 seen in Figures 1 and 2. The upper flange of each of the side frame members 46 is preferably formed to provide a depression 49 (Figure 7) longitudinally of the member, which serves as a track for guiding the rollers 50 which support the retractable loading table 24.

The loading table 24 comprises a very shallow, generally box-like structure which is closed on all sides and includes a hollow space within. The upper surface of the table is of a highly polished metal and includes a plurality of small openings 52 disposed over the entire surface of the table (Figures 1 and 8). At one edge of the table there is provided an opening for receiving a coupling 54 to which is attached a hose 56 having communication with a suitable source of pressure air, such as the compressor 57 (Figure 1). The air pressure through the hose 56 creates a lifting effect, through the openings 52 in the loading table, on the paper supported by the table. This enables a person to readily move a heavy pile of paper sheets across the polished table surface and to accurately position it as desired.

The leading edge 60 (Figure 4) of the loading table surface is inclined downwardly along its length to provide for a minimum drop of the paper sheets as they are deposited on the skid 30 and, also, to facilitate the unpiling operation which will be explained later. It will also be noted in Figure 7 that the side edge 62 of the table adjacent the tiltable table 26 is tapered inwardly toward the bottom of the table to provide for clearance of the mechanism associated with the tiltable table.

The retractable loading table 24 is supported at either side by a pair of elongated channel members 64 (Figure 7) which have one flange suitably fixed to the underside of the table. The opposite or bottom flange of each of the members 64 has fixed thereto a toothed rack 66 which is disposed for engagement with a drive gear 68 carried at opposite end portions of a shaft 70. The shaft 70 is rotatably mounted in bearings 72 disposed on the side frame members 46. The shaft 70 also includes a fixed sprocket 74 (Figures 17 and 18) which is connected by a chain 76 to another sprocket 77 keyed to the drive shaft of a motor 78. It is seen, therefore, that operation of the motor will effect a rotation of the drive gears 68 which, in turn, will move the racks 66 and the loading table 24 affixed thereto.

As seen in Figures 1 and 7, the loading table 24 also includes the rollers 50, which are disposed along the outer sides of the web of the channel members 64, for engagement with the tracks 49 in the upper flange of the side frame members 46. Each of these rollers is rotatably mounted on a spindle 80 which is fixed to the member 64, and the rollers are guidedly moved in the tracks 49 in response to rotation of the drive gears 68 relative to the toothed rack 66. It will be noted that the table 24 is thus movable from its inoperative position at the left in the drawings (Figure 1) to a position at the right (Figure 2) for receiving piles of paper sheets from the table 26 which spans the space between the trimmer 28 and the stacking machine.

Overlying the sheet-receiving position of the retractable table 24 is the pile aligning mechanism 32. The pile aligner 32 has a supporting structure including three aligned upright members 82 having cylindrical bearing supports 84 at their upper ends for mounting a cylindrical shaft 86 thereon. An intermediate portion of one or more of the uprights 82 is preferably fixed to the side frame member 46 of the machine, as by bolts 88 (Figure 7), to add to the rigidity of the structure.

Intermediate two of the shaft-supporting uprights 82, there is fixed to the shaft 86 a right-angle forming structure comprising a built-up channel member 90 (Figures 1–4) extending across the path of the retractable table 24, and a member 92, slidably supported on the member 90, with its web portion 94 (Figure 7) extending at right angles to the member 90. The end of the member 90 adjacent the shaft 86 is fixed to the shaft as by welding, by means of a split cylindrical bearing element 96. The bearing element 96 is releasably clamped to the shaft 86 by means, including a series of bolts 98, which join the split side of the cylindrical bearing. In this manner, the channel member 90 may be selectively fixed in position along the shaft 86 to accommodate various sizes of stacked sheets of paper. The free end of the member 90 is preferably supported for adjustment vertically by suitable means, such as the illustrated rod 97, which is supported by an overhead support (not shown). The lower end of the rod 97 includes a turnbuckle 99 for connection with the member 90, thereby providing for increment adjustment of the end of member 90 to level the latter. Of course, the bolts 98 on the bearing element 96 should be loosened prior to any adjustment of the turnbuckle 99, in order to afford rotation of the bearing element about the shaft 86.

The member 90 is fabricated from plate members and includes an elongated web 100 (Figures 8 and 10), an upper flange 102, and a lower flange 104. The flange portions 102 and 104 increase in width in the direction of the bearing element 96 to extend along the length of the latter. The plane side of the web 100 has detachably mounted thereon a relatively movable, plane surface panel 106, which is parallel to the web 100 and generally coextensive therewith. The panel 106 is supported on the web 100 at each of its end portions by means including a pair of vertically aligned pistons 108 (Figures 8, 10 and 11), which are supported in cylindrical bearings 110 carried by openings formed in the web 100. The pistons 108 are connected at one end to the panel 106 by a pin 112 extending through the end of the piston and through suitable openings provided in a pair of parallel attaching members 114 fixed to the rear face of the panel 106.

The rear end of each of the pistons 108 (to the left in

Figure 8) is additionally supported by a cylindrical housing 116, including a base portion 118 fixed in position on the web 100 by a plate 119 and an outer portion 120 detachably secured to the base 118 in extension forming relation thereto. A coil spring 122 is disposed within each of the housings 116 in position for biasing the pistons in the direction of the panel 106. The outer portion of the piston 108 extends through an opening in the end of the cylindrical housing portion 120, and includes a threaded end portion 123 which projects through a suitable opening in a strap member 124 extending from one pair of the pistons 108 to the other pair. Displacement of the strap member 124 relative to the outer end 123 of the pistons 108 is prevented by suitable means, such as the nuts 126 received by the threaded ends of the pistons.

The above described support means for the panel 106 affords movement of the panel through axial movement of the spring biased pistons 108. This movement is controlled through a manually operable means including a cam shaft 128, rotatably mounted in bearings 130 carried by the plate 119 (Figure 10), an eccentrically mounted circular cam 132 fixed to opposite ends of the camshaft 128 in position for engagement with the strap member 124, and a helical gear 134 fixed to the end of the camshaft adjacent the free end of member 90. A second shaft 136 is rotatably supported in a position above and normal to the camshaft 128, by a suitable bearing 138 mounted on the upper flange 102, and carries a second helical gear 140 in fixed relation thereto for meshing engagement with the gear 134 on the end of the camshaft 128. The second or operating shaft 136 extends over the loading area of the retractable table 24 and has fixed to its outer end portion a control means which preferably includes both an operating lever 142 and a turning wheel 144. Accordingly, the rotation of the shaft 136 produces a shifting of the panel 106 with respect to the table 24.

Looking particularly at Figures 4, 8 and 9, it will be noted that the panel 106 includes one or more recesses 146 disposed along the lower edge of the panel, and each recess has mounted therein a small arm member 148. The arm 148 is preferably of brass or some other soft metal and is swingably mounted on the panel, as by a screw 150. The free end of the arm 148 will, therefore, ride along the top of the table 24 and assist in alignment of the lowermost sheets of a pile supported on the table.

As indicated previously, the end of the pile aligning member 90 which is adjacent the supporting bearing element 96 carries the member 92. As seen in Figures 1 and 5, member 92 is a fabricated structural member comprising the vertically disposed web 94, which extends at right angles to the pressure panel 106 of the member 90 and forms the stem of the T, a channel member 154 which is slidably positioned on the upper flange 102 of the member 90 and forms the cross portion of the T, and a generally triangular-shaped, horizontal flange 156. The flange 156 is fixed to the upper edge of the web 94 and to the forward edge of the channel 154, and is suitably braced by means of stiffeners 158 and 160. As seen more completely in Figure 6, the channel 154 is disposed with its leg portions 162 astride an elongated, rectangular bearing block 164 which is fixed to the leading edge of the top flange 102 of the member 90. The bearing block 164 includes a hollow center portion 166 and a longitudinally extending slot 168 communicating therewith, which receive a series of bolts 170 extending upwardly through suitable openings in the overlying channel 154 to secure the latter to the block 164. It will be apparent that, by loosening the bolts 170, member 92 can be shifted along the bearing block 164 to selectively position the member along the pile aligning member 90.

Also mounted on the shaft 86 is the arm 34 which provides a front stop for the pile of paper sheets to be handled by the loading table 24. Looking particularly at Figures 1, 3 and 5, it is seen that the arm 34 is disposed adjacent the forward edge of the stacking machine in parallel, spaced relation to the member 90 and is rotatably mounted on the shaft 86. The front stop arm 34 is fabricated of structural members, including a channel-shaped member 172 having its web portion 174 disposed in a vertical plane and its flanges 176 and 178 diverging in width in the direction of the supporting shaft 86 for fixed engagement, as by welding, to a pair of circular bearing elements 180 which are rotatably supported on the shaft 86.

A split collar structure 182 is positioned intermediate the circular bearings 180 for adjustably locating the arm 34 along the shaft. The collar 182, being clamped in place by the bolts 184, is prevented from rotation relative to the shaft 86 by a key 185 (Figure 7) which is fixed to a portion of the collar 182 for engagement with a longitudinally extending keyway 186 (Figure 5) formed along the surface of the shaft. Furthermore, the stop arm 34 is biased toward the raised position seen in Figure 1 by a counterbalancing mechanism 188 (Figures 5 and 7) which includes an arcuately shaped, vertically extending plate 190 fixed, as by welding, to a plate structure 192 which is mounted on the cylindrical bearing elements 180 of the arm 34. More particularly, the bearings 180 have welded thereto, or otherwise suitably fastened, a channel member 194 to which the plate 192 is adjustably secured by means of bolts 196. The latter extend through suitable openings (not shown) in the channel web and through the slotted openings 198 (Figure 5) in the plate 192, thereby affording vertical adjustment of the arcuate plate 190.

The bolts 184, which secure the collar portions 182 together, also serve as a stop for limiting the swinging movement of the arm 34 about the shaft 86. The upper pair of bolts 184 being adjustably positioned for engagement with the upper portion of the plate 192 to limit the downward movement of the arm 34, and the lower pair of bolts 184 being adjustably positioned for engagement with the opposite edge portion of the plate 192 to limit the upward motion of the arm.

The arcuate plate 190 includes a groove 199 along its upper edge portions which provide a guideway for a cable 200, which extends from a counter-weight 202 along the groove 199 in plate 190 to an anchor bolt 204 at the top end of the arc formed by the plate. This construction provides for automatic withdrawal of the stop arm 34 from the working area of the loading table 24 upon release of the arm by the operator.

The inner surface of the arm 34, which faces the pile aligning member 90, supports a relatively movable front stop plate 206 which is vertically disposed in parallel relation to the panel 106 of the member 90. More particularly, the front stop plate 206 is supported on the vertical web 174 (Figure 5) by a pair of bolts 208 and 210, respectively, which are disposed adjacent the opposite ends of the plate. It may be desirable in some instances to spring load the stop plate 206, to thereby provide for a yielding engagement with the edge of the pile of sheets in the general manner described with respect to the rear stop plate 106. The bolt 208 provides a pivotal connection between the stop plate 206 and the web 174 and includes a flat, circular head portion which is flush with the outer surface of the plate 206. The opposite end of the front stop plate 206 mounts the inwardly extending stud bolt 210 which projects through a vertical slot 216 (Figure 7) in the web 174, to thereby provide for vertical movement of the stop plate relative to the supporting channel 172, about the axis of the bolt 208.

Underlying the area extending between the pile aligning member 90 and the arm 34 is a vertically movable platform 22 for supporting a removable platform or skid 30 onto which a stack of paper sheets may be loaded. The illustrated platform 22 (Figures 1 and 3) is mounted on a hydraulically actuated jack 224 and is movable from a position within a recess 226 in the floor to its elevated position closely underlying the loading table 24. The upper surface of the platform includes I-sections 228 fixed thereto adjacent each of the four corners for supporting the skid 30 in elevated relation to the platform to thereby afford easy removal of the loaded skid by a lift fork or the like. Preferably, the underside of the platform includes a series of rods 230 along the outer edges as a safety precaution. The hydraulic jack 224 is actuated by the motor driven pump 58 (Figure 1) which is connected thereto through suitable ducts (not shown). The pump 58 is controlled through an electrical circuit including a photoelectric cell 232 (Figure 3) which has its beam disposed in a plane closely underlying the plane of the loading table 24. The elevation of the platform 22 is automatically halted, when the beam of the photoelectric cell 232 is clear of the platform or the paper stacked thereon, to position the skid 30, or the top of the sheet stack thereon if the skid is loaded, in closely underlying relation to the retractable loading table.

Adjacent the receiving side of the loading table 24, that is the right side as viewed in Figures 3 and 4, is the tiltable table 26 which serves as the lay-on table for the stacking machine, and which is adapted to also serve as the lay-off table for the trimmer 28, as seen in Figure 1. This tiltable table 26 is a hollow plate structure, similar to the retractable loading table 24, with pressure air being supplied to the table through suitable means, which is not shown. A series of small openings 234 in the upper surface of table 26 affords an escape for the air, to thereby provide a lifting effect on paper stacked on the table.

Looking particularly at Figure 13, it is seen that the stacker lay-on table 26 is hingedly mounted on the side of the stacking machine by a supporting frame comprising a horizontal plate 236 which is fixed, as by welding, to a vertical plate 238 secured to the side channel member 46 by a plurality of bolts 240. The horizontal plate 236 supports a pair of spaced bearing structures 242 which rotatably support the opposite end portions of a shaft 244 providing the hinge axis for the table 26. Fixed to the shaft 244 at opposite ends thereof is a pair of outwardly extending brackets 246 providing a support for a plate 248 to which the air table 26 is secured by bolts 250.

The brackets 246 also present an inwardly extending stub portion, having an arcuate recess 252 at the ends thereof for supporting a pair of bearings 254 for another cross shaft 256. Looking particularly at Figures 15 and 16, it will be noted that a stop means, comprising a stud 257 fixed to the edge of the plate 236, is disposed in the path of the inner stub portion of the brackets 246 for limiting the upward movement of the tiltable table 26.

Intermediate the cross shafts 244 and 256, on the upper edge of the brackets 246, is an idler roller 258 supported on a shaft 260 which is journalled in a pair of bearings 262. The roller 258 is disposed with its upper surface generally tangential to the plane of the upper surfaces of the tables 24 and 26, in order to provide a rolling support for stacks of paper sheets being moved from one table to the other.

The shaft 244 which provides the hinge axis for the table 26, extends beyond the bearing 242 at one end thereof, and has fixed thereto an arm 264 (Figure 12) supporting a counterweight 266 at its outer end. The counterweight tends to swing the tiltable table 26 about the axis of the shaft 244, as indicated by the broken lines in Figure 13. In order to secure the table 26 in its horizontal position there is provided a locking mechanism comprising a rod 267 (Figure 11) which is axially movable for selected engagement with an opening 269 (Figure 12) in the adjacent bracket 246. The rod 267 is slidably supported in a pair of bearings 268 bolted, respectively, to the underside of the adjacent end bearing 242 for shaft 244 and to the fixed end portion of the counterweight arm 264. An operating handle 270 is provided at the outer end of the rod 267.

The cross shafts 244 and 256 each have fixed thereto an elongated roller 272 and 274, respectively, which comprise a roller structure for removing one or more of the lower sheets from the stack being loaded. Details of this operation will be explained more fully hereinafter. The rollers 272 and 274 are positioned with their adjoining surfaces being disposed in pressing relation to each other for rotation in unison. A drive means (Figure 13) is provided for the rollers in the form of a sprocket 276 fixed to one end of the shaft 244, a motor 278 supported by the horizontal plate 236 in depending relation thereto, and a chain 280 disposed around the sprocket 276 and another sprocket 282 fixed to the drive shaft 284 of the motor.

The roller 272 is in the form of a suction roll, in order to expedite the sheet removal function of the rollers. The roller 272 includes a hollow portion along its length which communicates with a suitable vacuum source, and the outer surface of the roller includes a number of small openings 275 through which air is drawn to thereby create a suction on sheets being fed to the rollers. Furthermore, the roller 274 is adjustably positioned in the arcuate recesses 252 for yielding engagement with the other roller 274, by means of a pair of set screws 286 each having a coil spring 288 interposed between a pair of nuts 290 on the threaded outer end of the screw and a spring seat 292 carried by the adjacent bracket 246.

*Operation*

Having in mind the above described structure, an explanation of the operation of the sheet stacking machine will be given to provide a better understanding of the invention.

Assuming that the skid 30 is empty and the stacking of trimmed paper sheets thereon is to proceed as the latter is moved from the trimmer 28, the various parts of the stacking machine will be in the position shown in Figure 2. The tiltable lay-on table 26 is in its horizontal position and is locked in place by engagement of the rod 267 with the opening 269 in the bracket 246. The loading table 24 is moved into position alongside the lay-on table 26 to receive a pile of sheets therefrom, the pile aligning member 90 is adjusted to the desired position to accommodate the particular size of sheets being stacked, and the platform 22 has been elevated to a position immediately underlying the loading table 24. Further, in the illustrated sheet-receiving position for the stacking machine 20, the front stop arm 34 is elevated to permit access to the loading table.

As the pile of trimmed sheets is removed from the trimmer 28, it is placed on the tiltable table 26, where the forward edge of the soiled and damaged under sheet is preferably separated from the remainder of the pile and fed between the rollers 272 and 274, as illustrated in Figure 14. As the pile is then moved across the idler roller 258 on to the loading table 24, the rotation of the suction roller effects a peeling of the diverted under sheet from the pile. And, in this respect, the rubber roller 274 provides with the suction roller 272 a positive motive means for the diverted sheet which is thereby directed downwardly to a suitable waste receptacle (not shown). Movement across the tables is, of course, greatly facilitated by the air pressure emanating from the tables 26 and 24, which provides a buoyant effect on the heavy pile of paper sheets.

It should also be noted that the rollers 272 and 274 are adjustably positioned relative to each other by means of the set screws 286 (Figures 15 and 16), and the tension exerted on the diverted under sheet may thereby be increased or decreased as desired. With this arrangement it is possible to create sufficient tension on the under sheet of the pile to thereby drag the entire pile across the table 26 and onto the table 24 without further assistance.

The pile of sheets is manually guided into position on the loading table 24, with two of the adjoining side edges of the pile engaging the rear stop panel 106 and the web 94. The front stop arm 34 is then brought down to a position of engagement with the table 24 to thereby abut another of the sides of the pile. At this point the lever 142, or the wheel 144 if preferred, is rotated to press the panel 106 against the edge of the pile, in order to correct any misalignment of the pile which may have occurred during its movement onto the table 24. In this respect, it will be noted that the initial movement of the pile of sheets onto the loading table 24 is accompanied by sufficient force in the direction of the web 94 to align the sheets along the edges which are normal to the stop plates 106 and 206.

With the pile aligned vertically, the motor 78 is started in order to rotate the drive gears 68 which engage the racks 66 to thereby retract the loading table 24. As the table 24 is withdrawn, the arm 34, which is supported against downward movement by the table, moves downwardly along the inclined edge 60 of the table. As the table 24 moves away from the arm 34, the latter drops a limited amount, as determined by the engagement of the upper pair of bolts 184 with the plate 192. The front stop panel 206, which has been supported by the table 24, now pivots about the bolt 208 to maintain a generally horizontal position (Figure 3) in edge-abutting relation to the pile of sheets on the table. The downward movement of the stop plate 206 with respect to the supporting channel member 172 is afforded through the movement of the bolt 210 in the slot 216 (Figure 7). It is seen, therefore, that the plate 206 functions to provide a front stop for the sheet pile during its entire movement downwardly onto the underlying skid. Consequently, the sheets are placed in a definite position on the skid 30, which is exactly the same position for each succeeding pile, thereby assuring true vertical alignment of the stack formed by a number of piles of sheets thus handled.

After the pile of sheets are deposited on the underlying skid, the platform 22 lowers automatically to a position placing the top of the sheet pile immediately below the path of movement of the retracted loading table. The lowering movement of the table is automatically controlled by the aforementioned electrical circuit which includes the photoelectric cell 232. The table 24 is then moved back into its pile receiving position overlying the skid 30 and the sheet pile which has been deposited thereon.

Succeeding piles of trimmed sheets are similarly handled, with the platform 22 lowering each time a pile of sheets is added thereto, in order to position the top of the stack being formed just below the path of the retractable table 24. Consequently, the loaded skid 30, when at rest, is always in position for receiving a succeeding pile in a manner providing for a minimum of downward movement of such pile on to the stack.

The schematic illustrations of Figures 19 to 27, inclusive, show, generally, the various steps of the stacking operation just described and provide a ready reference for the sequence of operation. Figure 19 shows a pile of sheets "A," which have been moved from the trimmer 28 to the lay-on table 26, in readiness to be received by the loading table 24. Figures 20 and 21 illustrate the pile "A" on the table 24, with the front stop arm 34 raised. In Figure 22 the front stop arm 34 has been lowered to a position resting on the table 24 and the plate 106 has been pressed against the adjoining edge of the sheets to align the pile in a vertical direction. Figure 23 illustrates the action of the front stop arm 34, as table 24 is withdrawn to deposit the pile "A" on to skid 30. The arm 34 has moved downwardly and the stop plate 206 has dropped to its lowermost horizontal position to provide a continuously acting stop for the pile during the withdrawing action of the table 24, as illustrated in Figures 24 and 25. Figure 26 shows how the platform 23 lowers, after the table 24 is withdrawn from the pile, to place the top of pile "A" immediately below the path of the loading table. Figure 27 shows the table 24, after it has moved back to its loading position in readiness for repeating the cycle of operation.

Looking now to Figures 28-30, it will be seen that advantageous use of the present invention can also be had with respect to the unpiling of a stack or lift. In some instances it is desirable to remove lesser piles from a stack or lift, without disturbing the vertical alignment of the pile or the stack. In such cases the stack X is loaded on to the platform 22, while the latter is lowered and the table 24 is withdrawn as seen in Figure 1. The table side of the stack is then manipulated, manually or otherwise, to provide an opening O (Figure 28) in the table side of the stack to permit entry of the table 24. The front stop plate 206 is in position on the opposite side of the stack to prevent shifting of the stack under the pressure of the moving table.

As the inclined edge 60 of the table passes through the stack and engages the front stop plate 206 (Figure 29), the latter is moved upwardly to permit the table 24 to move through the stack, as seen in Figure 30, to thereby separate the pile Y from the stack X. If desired, the rear stop plate 106 may now be moved into position to correct any misalignment of the pile Y. It is believed, however, that the lateral pressure of the inclined table edge 60 will provide a sufficiently strong engagement between the pile Y and the front stop plate 206 to maintain the alignment of the sheets of the pile throughout the unpiling operation. After the front stop plate has been moved upwardly (Figure 4), the pile Y may be readily removed from the table 24.

In the handling of some types of sheet material, it might be found desirable to increase the clearance between the bottom of table 24 and the top of the stack X during the unpiling operation, as by raising the table 24 or lowering the platform 22 after the table 24 has entered the opening O in the side of the stack. However, if the bottom of the table 24 is sufficiently smooth and the table is disposed slightly above the plane of separation for the pile Y, it has generally been found to be unnecessary to make any further adjustment of the table 24 or the platform 22 to achieve a satisfactory separation without disturbing the stack X.

It is seen, therefore, that the apparatus disclosed herein permits easy handling of relatively heavy piles of paper sheets, in a manner affording a true vertical alignment of the sheets. In the stacking operation, the rollers 272 and 274 serve to readily remove the bottom sheet of paper which has been soiled through direct surface contact with all of the sheet finishing machinery involved in handling the sheets prior to the final stacking operation described herein. Further, the adjustable pile aligning member 90 is positionable along its supporting shaft 86 to accommodate various widths of sheets. The stop plate 106 is readily actuable, through lever 142, to reposition any laterally shifted portion of the pile against the front stop plate 206 into true vertical alignment with the remainder of the pile.

Although not essential to the broader principles of the present invention, it should be noted that the use of air tables in connection with the disclosed apparatus greatly facilitates the movement of the piles of sheets and thereby increases the efficiency of the sheet handling mechanism.

It is also to be noted that the highly polished, preferably chrome-plated, air table 24 with its inclined forward edge 60 cooperates with the vertically movable platform 22 and the front and rear stop plates 206 and 106 to ease the aligned pile of sheets onto the platform with a minimum of vertical movement in order to avoid disturbing the vertical alignment of the pile. And, since the member 90 is adjustably fixed in position, the disclosed structure provides that each pile of sheets is placed in exactly the same position on the loading table, and each pile is removed therefrom in a manner resulting in a precise vertical alignment of the several stacks on the loading skid 30.

The handling of piles of sheet material in the manner described above also eliminates most of the manual handling of sheets, thereby reducing both waste of material and labor requirements. Particularly in the handling of quality grade sheet material, there is considerable loss due to damage to the sheets during the ordinary lifting and stacking of the sheets by hand. The present invention eliminates much of this by eliminating a considerable amount of the lifting and, also, by providing for the handling of a greater pile of sheets than two men could ordinarily lift.

Furthermore, apparatus of the type described eliminates much of the back-breaking labor normally involved in the stacking of paper sheets, and replaces individual skill, which is always subject to fluctuation through fatigue etc., with mechanical precision. Obviously, there is also provided means which will appreciably increase the speed of stacking paper sheets. The usual situation heretofore has been one wherein the stacking personnel pace the output of the associated equipment, whereas with a machine built in accordance with applicants' invention the output of two or more trimmers can be readily stacked while both trimmers are operating at capacity rates.

Then too, it is seen that this invention may be advantageously employed for unpiling. For example, it affords considerable advantage in providing means for withdrawing a few reams from a large lift without disturbing the vertical alignment of the sheets.

Although described in connection with particular mechanism involved in the handling of paper sheets, it is not intended to thereby limit the invention, since other mechanism might readily be designed, and other products obviously handled, without departing from the principles disclosed herein.

The invention disclosed herein may be considered an improvement over that shown in the co-pending application Serial No. 400,867 filed December 29, 1953 for Method and Apparatus for Stacking Sheet Material, which application is assigned to the same assignee and includes claims covering certain subject matter disclosed herein.

We claim:

1. Apparatus for handling sheet material comprising a table disposed for lateral movement, a platform underlying a portion of the path of movement of said table, means providing relative vertical movement between said platform and said table, and means adjustably positionable in overlying relation to said table and said platform for engagement with a side of a pile of sheets supported on said table to provide for vertical alignment of the sheets, said aligning means including a vertically movable member disposed for engagement with the sheets along one side of the sheet pile and for engagement with the upper surface of said table for support thereby, whereby said movable member provides a vertically movable and continuous lateral support for the pile of sheets during the lateral movement of said table relative to said platform to effect a transfer of the pile of sheets between said table and platform.

2. Apparatus for handling paper sheets comprising a frame, a table member supported on said frame for relative movement in a horizontal plane, said table member including a downwardly inclined forward edge, a platform underlying the path of movement of said table, means providing relative vertical movement between said platform and said table, and a sheet pile aligning means disposed for vertical swinging movement relative to the path of movement of said table for supported engagement with said table, whereby said pile aligning means is adapted to be supported on said table when the latter is in its pile-supporting position overlying said platform, and whereby the withdrawal of said table from said position overlying said platform causes said pile aligning means to move downwardly along said inclined forward edge of the table to provide a continuous lateral support for the sheet pile during the vertical movement of the latter onto said platform.

3. Apparatus for handling paper sheets comprising a frame structure, a loading table supported on said frame structure for relative movement in a horizontal plane, a vertically movable platform underlying a portion of the path of movement of said loading table, and means carried by said frame for effecting vertical alignment of a pile of sheets supported on said loading table in a position of overlying relation to said platform, said sheet aligning means comprising a pair of vertically disposed, parallel members positionable in overlying supported relation to said table for engagement with opposite sides of the pile of sheets thereon, one of said vertically disposed members being movable vertically to provide a continuous lateral support for the pile of sheets as said table is retracted to deposit the pile on the underlying platform.

4. Paper stacking apparatus comprising a frame structure, a vertically movable platform disposed for movement within said frame structure, and means carried by said frame structure for vertically aligning piles of paper sheets and stacking same in aligned relation on said platform, said means comprising a loading table supported on said frame structure for horizontal movement relative to a position overlying said platform, and a pair of vertically disposed, parallel members adjustably mounted on said frame structure in overlying relation to said platform and to the path of movement of said loading table, said parallel members being operable to yieldingly engage opposite side edges of a pile of paper sheets supported on said table to urge the sheets into vertically aligned relation, and one of said parallel members being movable downwardly as said table is withdrawn from a position overlying said platform, whereby said one member provides a constant lateral support for the pile of sheets as the latter is being deposited on said platform.

5. Apparatus for stacking paper sheets comprising a frame structure, a loading table supported on said frame structure for relative movement in a horizontal plane, a vertically movable platform underlying a portion of the path of movement of said table, and means carried by said frame structure for vertically aligning a pile of sheets on said table in a predetermined position overlying said platform, said aligning means including a pair of vertically disposed, parallel members adjustably positionable in overlying relation to said table for engagement with opposite sides of the pile of sheets thereon, one of said vertically disposed members being laterally movable in a direction normal to the side of the pile engaged thereby, and one of said members being movable downwardly as said table is retracted from its pile-supporting position in a direction away from said one member, to thereby provide a continuous lateral support for the pile of sheets as the latter is being deposited on the underlying platform.

6. Apparatus for handling paper sheets comprising, a frame structure, a table supported on said frame structure for movement in a horizontal plane, a vertically movable platform underlying a portion of the path of movement of said table, a pile aligning means disposed in closely overlying relation to the horizontal plane of the path of movement of said table, said pile aligning means including a support member adjustably positioned on said frame structure and a vertically disposed plate member carried by said support member for vertical swinging movement relative thereto, said vertically disposed plate member being positioned for supporting engagement by the upper surface of said table, whereby said plate member is adapted for engagement with a side edge of a pile of sheets being transferred between the table and platform and is vertically movable with the pile of sheets to provide a lateral support therefor during the transfer.

7. In a paper handling apparatus including a frame structure and a table mounted thereon, means for vertically aligning the edges of a pile of paper sheets disposed on said table comprising, a pair of elongated members disposed at right angles to each other in overlying relation to the table and including inwardly facing, vertically extending wall surfaces for engagement with a pair of contiguous side edges of the table-supported pile of sheets, said pair of elongated members being fixed to the frame structure for adjustment relative thereto and with respect to each other, to thereby provide for receiving various sizes of paper sheets on the table, and comprising an arm mounted on said frame structure for movement relative to a position opposite one of said pair of elongated members in horizontally spaced relation thereto, said arm pivotally supporting an additional elongated member for vertical swinging movement of the latter with respect to said arm, said additional elongated member having an inwardly facing, vertically extending wall surface parallel to the wall surface of one of said pair of elongated members, and means for limiting the relative movement of said additional elongated member with respect to said arm.

8. Apparatus for stacking paper sheets comprising, a supporting frame structure, a lay-on table supported on one side of said frame structure, a retractable loading table carried by said frame for movement in a horizontal plane to and from a position forming a coplanar extension of said lay-on table, a pair of parallel rolls journalled on said frame in adjacent, parallel relation to the edge of said lay-on table which is adjacent the path of movement of said retractable table, said rolls having surface engagement with each other for rotation together, whereby a pile of paper sheets being moved from said lay-on table to said loading table may have one or more bottom sheets removed therefrom by feeding such sheets into the nip of said rolls while the latter are being rotated, a pair of vertically extending side wall members mounted on said frame at right angles to each other in a boundary defining position for a pile of paper sheets moved onto said loading table from said lay-on table, a vertical panel member carried by said frame for movement relative to a position overlying said loading table and parallel to one of said pair of side wall members, and a vertically movable platform underlying the area defined by said wall members and said panel member, whereby a pile of paper sheets on said table may be vertically aligned by said pair of side walls and said panel member, and whereby said loading table is retractable from its pile-supporting position to deposit said pile on said underlying platform, and said platform is movable downward to a position for similarly receiving a subsequently aligned pile of paper sheets in vertically aligned relation with the first pile of sheets.

9. In a paper stacking mechanism having a frame supporting a lay-on table and a loading table which are positionable in generally coplanar, adjacent relation to each other, means positioned between said lay-on table and said loading table for effecting removal of the bottom one or more of a pile of paper sheets as the latter is moved from the lay-on table to the loading table, said means comprising a pair of elongated, parallel rollers rotatably mounted on said frame in a position parallel to and beneath the adjoining edges of said tables, said pair of rollers having frictional contact along their surfaces to thereby present a sheet-receiving nip which, upon rotation of the rollers, will direct a sheet held therebetween downwardly away from said tables, one of said pair of rollers including a plurality of openings along its surface having communication through the roller with a suction means, and a third roller rotatably mounted on said frame in parallel, overlying relation to said pair of rollers with its upper surface generally coplanar with the upper surfaces of said lay-on table and said loading table, whereby said third roller is operable to direct a sheet of paper downwardly into said sheet-receiving nip and also to provide a rolling support for a pile of paper sheets as it is moved from said lay-on table to said loading table.

10. In combination with a paper stacking mechanism having a horizontal table member for receiving a pile of paper sheets thereon, means for effecting vertical alignment of the pile of sheets comprising, a support for said pile aligning means including an arm extending across the table member, a pair of elongated members carried by said arm and presenting vertically disposed surfaces extending upwardly from a position closely adjacent the upper surface of the table, said elongated members being positioned at right angles to each other with their vertically disposed surfaces defining side portions of a pile-aligning area on the table, one of said elongated members being adjustably mounted on said support arm for selective positioning along the length of the other elongated member, means connecting said other elongated member with said support arm in a manner affording relative movement therebetween in a direction normal to the vertical surface of said other member, said connecting means including a biasing means urging said other member toward the pile-aligning area on the table, and means operatively connected with said other member to provide a movement thereof relative to said support arm in opposition to said biasing means.

11. Apparatus for handling sheet material comprising a table member disposed for lateral movement, said table member having a plurality of small openings formed in the upper surface thereof affording the introduction of pressure air therethrough, a platform underlying a portion of the path of movement of said table, means providing relative vertical movement between said platform and said table, and means adjustably positionable in overlying relation to said table and said platform for engagement with a side of a pile of sheets supported on said table to provide for vertical alignment of the sheets, said aligning means including a vertically movable member disposed for engagement with one side of the sheet pile and for supporting engagement by the upper surface of said table, whereby said movable member provides a continuing and vertically movable lateral support for the pile of sheets during the lateral movement of said table relative to said platform which effects a transfer of the pile of sheets between said table and platform.

12. Apparatus for stacking paper sheets comprising, a supporting frame structure, a lay-on table supported along one side of said frame structure for vertical swinging movement relative thereto, a retractable loading table carried by said frame for movement in a horizontal plane to and from a position forming a coplanar extension of said lay-on table when the latter is disposed in a horizontal plane, said lay-on table and said loading table each comprising a generally hollow structure having a plurality of small openings formed in the upper surface thereof, a source of air pressure communicating with the hollow portions of said lay-on table and said loading table to thereby direct pressure air upwardly through the openings in said upper surfaces of the tables, a pair of parallel rollers journalled on said frame in adjacent, parallel relation to the adjoining edges of said tables, said pair of rollers having frictional contact along their surfaces to thereby present a sheet-receiving nip which, upon rotation of the rollers, will direct a sheet feed into said nip downwardly away from said tables, a pair of vertically extending side wall members mounted on said frame at right angles to each other in a boundary defining position for a pile of paper sheets moved onto said loading table from said lay-on table, a vertical panel member carried by said frame for movement relative to a position overlying said loading table and parallel to one of said pair of side wall members, and a vertically movable platform underlying the area defined by said side wall members and said panel member.

13. Apparatus for handling sheet material comprising a table disposed for lateral movement, a platform underlying a portion of the path of movement of said table, means providing relative vertical movement between said platform and said table, and pile aligning means including a vertically movable member disposed in over-lying relation to said table for engagement with one side of the sheet pile and for vertical movement therewith so as to provide a vertically movable and continuous lateral support for the sheet pile during transfer of the sheet pile between the table and the platform as said table is moved laterally with respect to said platform.

14. Apparatus for handling paper sheets comprising a frame structure, a table supported on said frame structure for relative movement in a horizontal plane, a platform underlying a portion of the path of movement of said table, means providing relative vertical movement between said platform and said table, and means carried by said frame for effecting vertical alignment of a pile of sheets supported on said table, said sheet aligning means comprising a pair of members disposed in overlying relation to said table and at right angles with respect to each other for engagement with adjoining sides of the pile of sheets, one of said members bein movable vertically relative to a position below the path of said table and providing a continuous lateral support for the pile of sheets as said table is retracted to deposit the pile on the underlying platform.

References Cited in the file of this patent
UNITED STATES PATENTS

| | | |
|---|---|---|
| 785,821 | Mills | Mar. 28, 1905 |
| 812,936 | Kneisly | Feb. 20, 1906 |
| 1,039,521 | Green | Sept. 24, 1912 |
| 1,094,048 | Barber | Apr. 21, 1914 |
| 1,129,214 | McIlvried | Feb. 23, 1915 |
| 1,269,115 | Reese | June 11, 1918 |
| 2,065,673 | Fay | Dec. 29, 1936 |
| 2,065,674 | Fay | Dec. 29, 1936 |
| 2,176,307 | Lamb | Oct. 17, 1939 |
| 2,204,207 | Coburn | June 11, 1940 |
| 2,205,767 | Lamb | June 25, 1940 |
| 2,234,990 | Todhunter | Mar. 18, 1941 |
| 2,650,722 | Stabile | Sept. 1, 1953 |
| 2,675,928 | Slater | Apr. 20, 1954 |